(12) United States Patent
Nozawa

(10) Patent No.: US 8,022,148 B2
(45) Date of Patent: Sep. 20, 2011

(54) POLYPROPYLENE RESIN COMPOSITION AND FILM MADE THEREOF

(75) Inventor: Hiroshi Nozawa, Chiba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 12/667,593

(22) PCT Filed: Jul. 3, 2008

(86) PCT No.: PCT/JP2008/062434
§ 371 (c)(1),
(2), (4) Date: Mar. 5, 2010

(87) PCT Pub. No.: WO2009/008459
PCT Pub. Date: Jan. 15, 2009

(65) Prior Publication Data
US 2010/0204369 A1  Aug. 12, 2010

(30) Foreign Application Priority Data
Jul. 6, 2007  (JP) ................. 2007-178321

(51) Int. Cl.
C08K 5/04 (2006.01)
(52) U.S. Cl. ........................ 525/387; 525/240
(58) Field of Classification Search .................. 525/387, 525/240
See application file for complete search history.

(56) References Cited

FOREIGN PATENT DOCUMENTS

| | | | |
|---|---|---|---|
| JP | 57-137341 A | 8/1982 |
| JP | 58-173145 A | 10/1983 |
| JP | 61-85462 A | 5/1986 |
| JP | 2-69549 A | 3/1990 |
| JP | 3-81354 A | 4/1991 |
| JP | 05-000448 A | 1/1993 |
| JP | 08-169993 A | 7/1996 |
| JP | 10-158463 A | 6/1998 |
| JP | 11-029689 A | 2/1999 |
| JP | 2000-119480 A | 4/2000 |
| JP | 200230087 | * | 8/2000 |
| JP | 2002-348334 A | 12/2002 |

* cited by examiner

*Primary Examiner* — Robert D. Harlan
(74) *Attorney, Agent, or Firm* — Sughrue Mion, PLLC

(57) ABSTRACT

A polypropylene resin composition that has a melt flow rate of 1.5 (g/10 minutes) or more and is obtainable by melt-kneading 94 to 98 parts by weight of (A) a propylene copolymer that comprises a polymer portion being obtainable by polymerizing monomers containing propylene as the major component and having an intrinsic viscosity of 2.0 (dL/g) or more and a copolymer portion being obtainable by copolymerizing propylene and ethylene, 2 to 6 parts by weight of (B) an ethylene polymer having a density of 0.920 g/cm³ or more, and (C) an organic peroxide, provided that the total weight of the propylene copolymer (A) and the ethylene polymer (B).

5 Claims, No Drawings

POLYPROPYLENE RESIN COMPOSITION AND FILM MADE THEREOF

This is a National Stage of International Application No. PCT/JP2008/062434 filed Jul. 3, 2008, claiming priority based on Japanese Patent Application No. 2007-178321, filed Jul. 6, 2007, the contents of all of which are incorporated herein by reference in their entirety.

TECHNICAL FIELD

The present invention relates to polypropylene resin compositions and films made thereof. Particularly, the invention relates to polypropylene resin compositions suitable as materials of films for wrapping retortable foods, the films being excellent in appearance, transparency, impact resistance and antiblocking property, and films made thereof.

BACKGROUND ART

Polypropylene is excellent in rigidity and heat resistance and therefore is used widely in the field of materials for packaging such as food packaging and fiber packaging. As to the property of packaging materials, the materials are required to be excellent in impact resistance at low temperatures, heat sealability, and antiblocking property in addition to rigidity and heat resistance and also to be excellent in appearance with few fisheyes.

In particular, a packaging material of retortable foods is required to be satisfactory in both heat resistance which is sufficient for withstanding retort sterilization in which high temperature treatment is applied and impact resistance at low temperatures sufficient for withstanding use at low temperatures.

The variety of materials for packaging retortable foods has recently increased and it is required that contents can be checked from the outside. Therefore, packaging materials with excellent transparency have been demanded.

On the other hand, JP 8-169993 A, for example, discloses a polypropylene resin composition having low-temperature impact strength, transparency and slipping property and comprising 51 to 99% by weight of a resin compositions that comprises 1 to 95% by weight of a polypropylene and 5 to 95% by weight of an ethylene-propylene random copolymer having an ethylene content of 10 to 90 mol % and that contains amorphous rubber particles having a diameter of 10 μm or less, and 1 to 49% by weight of a high density polyethylene having a density of 0.935 g/cm$^3$ or more.

JP 10-158463 A discloses a polypropylene film for retorting that comprises 96 to 99 wt % of a propylene-ethylene block copolymer having specific properties and 1 to 4 wt % of a high density polyethylene and that is excellent in impact resistance at low temperatures and also in antiblocking property.

JP 2000-119480 A discloses a propylene resin composition that comprises a propylene-ethylene block copolymer having specific properties and an ethylene-α-olefin copolymer having specific properties and that is balanced in impact resistance at low temperatures, heat seal strength, transparency, resistance to flexural whitening resistance, heat resistance, and so on, and a film for retortable food packaging produced by using the composition.

However, films made of the resin compositions disclosed in these documents are insufficient in appearance, transparency, impact resistance, and anti-blocking property, and there have not found any resin compositions suitable as materials of films for retortable food packaging or films made thereof.

Under such situations, the objective of the present invention is to provide a polypropylene resin composition that is excellent in appearance, transparency, impact resistance and anti-blocking property and suitable as a material of a film for retortable food packaging, and a film made thereof.

DISCLOSURE OF THE INVENTION

As a result of an extensive research, the present inventors found that the present invention can solve the aforementioned problems and have accomplished the present invention.

The invention is a polypropylene resin composition that has a melt flow rate of 1.5 (g/10 minutes) or more and is obtainable by melt-kneading 94 to 98 parts by weight of (A) a propylene copolymer that comprises a polymer portion being obtainable by polymerizing monomers containing propylene as the major component and having an intrinsic viscosity of 2.0 (dL/g) or more and a copolymer portion being obtainable by copolymerizing propylene and ethylene, 2 to 6 parts by weight of (B) an ethylene polymer having a density of 0.920 g/cm$^3$ or more, and (C) an organic peroxide, provided that the total weight of the propylene copolymer (A) and the ethylene polymer (B) is let to be 100 parts by weight.

BEST MODE FOR CARRYING OUT THE INVENTION

The propylene copolymer (A) is composed of a polymer portion that is obtained by polymerizing monomers containing propylene as the major component (henceforth, sometimes referred to as (A-1 portion)) and a copolymer portion that is obtained by copolymerizing propylene and ethylene (henceforth, sometimes referred to as (A-2 portion)).

From the viewpoint of heat resistance, the (A-1 portion) is preferably a propylene homopolymer, and in this case, it preferably has a melting point of 160° C. or higher. While the (A-1 portion) may be a copolymer of propylene and a little amount of other monomers, such as ethylene and butene-1, it is preferable, in this case, that the (A-1 portion) have a melting point of 155° C. or higher.

The intrinsic viscosity of the (A-1 portion) is 2.0 (dL/g) or more. If the intrinsic viscosity is less than 2.0 (dL/g), fisheyes may be formed in a film to be obtained, so that the appearance of the film may deteriorate, or the anti-blocking property of the film may be poor. The intrinsic viscosity is more preferably 2.5 (dL/g) or more, and from the viewpoint of processability, it is preferably 3.5 (dL/g) or less.

From the viewpoint of transparency and low-temperature impact resistance, the content of ethylene in the (A-2 portion) is preferably 15 to 60% by weight.

The intrinsic viscosity of the (A-2 portion) is preferably 2.0 (dL/g) or more, and more preferably 2.5 (dL/g) or more from the viewpoint of anti-blocking property. From the viewpoint of appearance, it is preferably 4.5 (dL/g) or less.

From the viewpoint of polymerization productivity and low-temperature impact resistance, it is preferable in the propylene copolymer (A) that the content of the (A-2 portion) be 7 to 50% by weight.

Examples of the method for producing the propylene copolymer (A) include methods comprising polymerizing such monomers as propylene and ethylene in the presence of a catalyst such as a Ziegler Natta catalyst and a metallocene catalyst.

Specific examples include a method comprising adding monomers and a catalyst to an inert solvent, such as hexane, heptane, toluene and xylene, and polymerizing the monomers; a method comprising adding a catalyst to liquid propylene and/or ethylene and polymerizing monomers in a liquid state; a method comprising adding a catalyst to vaporous propylene and/or ethylene and polymerizing monomers in a vaporous state; or a method comprising conducting polymerization by combining the foregoing methods.

In particular, from the viewpoint of productivity, a method is preferable that comprises a first step of producing a (A-1 portion) by polymerizing monomers containing propylene as the main ingredient substantially in the absence of an inert solvent, and a second step of producing a (A-2 portion) by copolymerizing, after the first step, propylene and ethylene in the presence of the (A-1 portion). In this method, it is more preferable to perform the second step in a vaporous phase.

Examples of the method for regulating the intrinsic viscosity of the (A-1 portion) and the ethylene content of the (A-2 portion) in the production method of the propylene copolymer (A) include a method comprising regulating the added amount of a molecular weight regulator, such as hydrogen gas and a metal compound, and the added amount of ethylene in each step of monomer polymerization, and a method comprising regulating the temperature, the pressure, or the like in monomer polymerization.

The contents of the (A-1 portion) and the (A-2 portion) in the propylene copolymer (A) can be controlled by adjusting the polymerization time of monomers, the size of the polymerization vessel, the retained amount of polymers in the polymerization vessel, the polymerization temperature, the polymerization pressure, etc. in the production of the propylene copolymer (A).

The ethylene polymer (B) is an ethylene homopolymer or an ethylene-α-olefin copolymer comprising ethylene as a main constituent.

Examples of the ethylene-α-olefin copolymer include an ethylene-propylene copolymer, an ethylene-butene-1 copolymer, an ethylene-hexene-1 copolymer, an ethylene-octene-1 copolymer, and a high pressure process low density polyethylene.

Especially, the high pressure process low density polyethylene is preferable. The method for producing the high pressure process low density polyethylene may be, for example, a method comprising polymerizing ethylene in the presence of a radical generator, at a polymerization pressure of 140 to 300 MPa and a polymerization temperature of 200 to 300° C., in a vessel type reactor or a tubular reactor.

Those may be used singly or two or more of them may be used in combination.

The density of the ethylene polymer (B) is 0.920 g/cm$^3$ or more. If it is less than 0.920 g/cm$^3$, the antiblocking property of a film to be obtained may become poor. The density of the ethylene polymer (B) is preferably 0.990 g/cm$^3$ or less.

From the viewpoints of transparency, antiblocking property, and so on, the melt flow rate at 190° C. of the ethylene polymer (B) is preferably 3.0 (g/10 minutes) or more, and it is preferably 18 (g/10 minutes) or less.

Examples of the method for regulating the density and the melt flow rate of the ethylene polymer (B) include a method in which hydrogen and/or a hydrocarbon, such as methane and ethane, is used as a molecular weight regulator, and a method in which the content of an α-olefin is regulated.

The polypropylene resin composition of the present invention contains 94 to 98 parts by weight of the propylene copolymer (A) and 2 to 6 parts by weight of the ethylene polymer (B), provided that the sum total of (A) and (B) is let be 100 parts by weight. The polypropylene resin composition of the present invention preferably contains 94 to 97 parts by weight of the propylene copolymer (A) and also preferably contains 3 to 6 parts by weight of the ethylene polymer (B).

If the amount of the propylene copolymer (A) is less than 94 parts by weight (in other words, if the amount of the ethylene polymer (B) exceeds 6 parts by weight), the impact resistance of a film to be obtained may be poor. If the amount of the propylene copolymer (A) exceeds 98 parts by weight (in other words, if the amount of the ethylene polymer (B) is less than 2 parts by weight), the antiblocking property of a film to be obtained may be insufficient.

Examples of the organic peroxide (C) include conventional organic peroxides, and an organic peroxide is preferred which has a decomposition temperature of 120° C. or higher at which the half life of the organic peroxide becomes one minute.

Examples of the organic peroxide which has a decomposition temperature of 120° C. or higher at which the half life of the organic peroxide is one minute include 1,1-bis(tert-butylperoxy)cyclohexane, 2,2-bis(4,4-di-tert-butylperoxycyclohexyl)propane, 1,1-bis(tert-butylperoxy)cyclododecane, tert-hexylperoxyisopropyl monocarbonate, tert-butylperoxy-3,5,5-trimethyl haxonoate, tert-butyl peroxylaurate, 2,5-dimethyl-2,5-di-(benzoylperoxy)hexane, tert-butylperoxyacetate, 2,2-bis(tert-butylperoxy)butene, tert-butylperoxybenzoate, n-butyl-4,4-bis(tert-peroxy)valerate, di-tert-butylperoxyisophthalate, dicumyl peroxide, α-α'-bis(tert-butylperoxy-m-isopropyl)benzene, 2,5-dimethyl-2,5-di-(tert-butylperoxy)hexane, 1,3-bis(tert-butylperoxydiisopropyl)benzene, tert-butyl cumyl peroxide, di-tert-butyl peroxide, p-menthane hydroperoxide, and 2,5-dimethyl-2,5-di-(tert-butylperoxy)hexyne-3.

An organic peroxide which has a decomposition temperature of 150° C. or higher at which the half life of the organic peroxide is one minute is more preferable.

The content of the organic peroxide (C) is preferably 0.001 to 5 parts by weight, and more preferably 0.012 to 0.1 parts by weight, relative to 100 parts by weight in total of the propylene copolymer (A) and the ethylene polymer (B).

The polypropylene resin composition of the present invention can be obtained by melt-kneading the propylene copolymer (A), the ethylene polymer (B), and the organic peroxide (C).

The melt-kneading of the propylene copolymer (A), the ethylene polymer (B), and the organic peroxide (C) makes a film obtained from the obtained resin composition exhibit excellent antiblocking property.

The melt-kneading can be performed by using a conventional method and a conventional machine.

Examples of the method include a method in which the propylene copolymer (A), the ethylene polymer (B), the organic peroxide (C) and various additives are mixed with a mixing device, such as a Henschel mixer, a ribbon blender, and a tumble mixer, and then are melt-knead; and a method in which the propylene copolymer (A), the ethylene polymer (B), the organic peroxide (C), and various additives are fed, respectively, at a certain rate continuously by means of a metering feeder to obtain a uniform mixture, and then the mixture is melt-kneaded by using an extruder equipped with a single screw or two or more screws, a Banbury mixer, a roll type kneading machine, or the like.

The melt-kneading temperature is preferably 180° C. to 350° C.

The polypropylene resin composition of the present invention has a melt flow rate of 1.5 (g/10 minutes) or more. If the melt flow rate is less than 1.5 (g/10 minutes), the film productivity may be low because of an increased extrusion load generated at the time of film processing. From the viewpoint of productivity, it is preferably 1.8 (g/10 minutes) or more. It is more preferably 3.5 (g/10 minutes) or more because the effect of the present invention is observed remarkably. From the viewpoint of fisheye, it is preferable that the melt flow rate be 7.0 (g/10 minutes) or less.

Examples of the method of controlling the melt flow rate of the polypropylene resin composition of the present invention include a method including regulating the intrinsic viscosities of the propylene copolymer (A) and the ethylene polymer (B); a method comprising regulating the temperature, the kneading power, and so on to be used in the melt-kneading of the propylene copolymer (A), the ethylene polymer (B), and the organic peroxide (C); a method comprising regulating the content of the organic peroxide (C) in the melt-kneading of the propylene copolymer (A), the ethylene polymer (B), and the organic peroxide (C). Especially, the method comprising regulating the content of the organic peroxide (C) in the melt-kneading of the propylene copolymer (A), the ethylene polymer (B), and the organic peroxide (C) is preferred.

The polypropylene composition of the present invention may further contain various additives, such as a neutralizer, an antioxidant, a UV absorber, an antistatic agent, an anti-clouding agent, a lubricant, an antiblocking agent, and a nucleating agent, as needed.

By processing the polypropylene composition of the present invention into a film, the film of the present invention can be obtained.

The method of processing the polypropylene composition of the present invention may be a method which is usually used in the industry, and examples of such a method include extrusion forming, blowing, injection molding, compression molding, and calendering.

Especially, extrusion forming, such as T die forming and tubular forming, is preferred. In particular, an unstretched film can be obtained well by the T die method.

The film of the present invention is preferably 10 to 500 μm, more preferably 10 to 100 μm in thickness.

The film of the present invention preferably has a surface roughness sRa of 0.14 μm or more. If the surface roughness sRa is 0.14 μm or more, the film can exhibit excellent antiblocking property. The surface roughness sRa is preferably 0.50 μm or less.

The method for controlling the surface roughness may be a method comprising regulating the extrusion temperature, the cooling temperature, the film forming rate, etc. applied during film formation.

The film of the present invention may be subjected to surface treatment, such as corona discharge treatment, flame treatment, plasma treatment and ozonization, by a method conventionally used in the industry.

The film of the present invention can be used suitably as a film for packaging retortable foods to be subjected to heat treatment at high temperatures.

The film of the present invention can be used in a composite film. The composite film is a film obtained by laminating the film of the present invention and another film.

Examples of the "another film" include a biaxially oriented polypropylene film, an unoriented nylon film, an oriented poly(ethyl terephthalate) film, and aluminum foil.

Examples of the method for producing a composite film include dry lamination and extrusion lamination.

Hereafter, the invention is described with reference to Examples and Comparative Examples. The measurements of the respective items disclosed in the detailed description of the invention, Examples and Comparative Examples were measured by the following methods.

(1) Contents (% by Weight) of (A-1 Portion) and (A-2 Portion) in propylene copolymer (A)

The contents were determined from the material balance of polymerization.

(2) Intrinsic Viscosity ([η], Unit: dL/g)

Measurement was performed in 135° C. Tetralin using an Ubbelohde viscometer. As to the intrinsic viscosity of the (A-1 portion), a sample extracted from a polymerization vessel was measured. The intrinsic viscosity of the portion (A-2 portion) portion was calculated by using the following equation.

Intrinsic viscosity of (A-2 portion) portion=(((intrinsic viscosity of propylene copolymer (A))×100−(intrinsic viscosity of (A-1 portion))×(content (% by weight) of (A-1 portion))))/(content (% by weight) of (A-2 portion))

(3) Ethylene Content (Unit: % By Weight)

The ethylene content was calculated in accordance with the method disclosed in "Kobunshi Handbook (Polymer Handbook)" page 616 (published by Kinokuniya Co., Ltd., 1995).

As to the ethylene content of the (A-1 portion), a sample extracted from a polymerization vessel was measured.

The ethylene content of the (A-2 portion) was calculated by using the following equation.

Ethylene content of (A-2 portion) portion=(((ethylene content of propylene copolymer (A))×100−((ethylene content of (A-1 portion))×(content (% by weight) of (A-1 portion)))/(content (% by weight) of (A-2 portion))

(4) Melt Flow Rate (MFR; Unit: g/10 Minutes)

Measurement was conducted in accordance with JIS K7210. The MFR of a polypropylene resin composition was measured at a temperature of 230° C. and a load 2.16 kgf. The MFR of an ethylene polymer was measured at a temperature of 190° C. and a load 2.16 kgf.

(5) Melting Point (Unit: ° C.)

Using a differential scanning calorimeter (DSC manufactured by PerkinElmer, Inc.), about 10 mg of sample was melted at 220° C. in a nitrogen atmosphere, followed by rapid cooling to 150° C. After holding at 150° C. for 1 minute, the temperature was reduced to 50° C. at a rate of 5° C./min. Then, after the sample was held at 50° C. for 1 minute, the temperature was increased at a rate of 5° C./minute. The peak temperature of the maximum peak in the resulting fusion endothermic curve was defined as a melting point (Tm). The melting point of indium (In) measured at a temperature increasing rate of 5° C./min by using that measuring method was 156.6° C.

(6) Density of Ethylene Polymer (Unit: g/cm$^3$)

Measurement was carried out in accordance with JIS K6760. It is noted that as for ethylene polymers having a melting temperature of 100° C. or higher, measurement was carried out after execution of annealing in accordance with JIS K6760.

(7) Transparency (Haze, Unit: %)

Measurement was carried out in accordance with JIS K7105.

(8) Antiblocking Property (Unit: Kg/12 cm$^2$)

Two pieces of film each having a size of 150 mm×30 mm and taken with its machine direction matched its longer side direction were superposed together and were conditioned at 80° C. for 24 hours under a load of 500 g within an area of 40 mm×30 mm. Then, the sample was left at rest for at least 30 minutes in an atmosphere having a temperature of 23° C. and a humidity of 50%. Thereafter, the films were peeled at a rate of 200 mm/min using a tensile tester produced by Toyo Seiki Seisaku-sho Co., Ltd. The force needed for the peeling of the films was measured.

(9) Impact resistance (unit: Kg·cm/mm)

The impact strength of a film was measured at −15° C. using a hemispherical impact head having a diameter of 15 mm by a film impact tester manufactured by Toyo Seiki Seisaku-sho, Ltd.

(10) Appearance Evaluation (Fisheye)

In a visual inspection of a film was counted the number of fisheyes having a diameter of 200 μm or more observed within an area of 100 $cm^2$.

(11) Surface Roughness

The surface roughness of a film was measured in areas of 1 mm in the machine direction (MD) and 1 mm in the longer side direction (TD) (at pitches in TD of 2 μm), at a rate of 0.2 mm/sec in the machine direction (MD) by using a three-dimensional surface roughness analyzer, SURFCORDER SE-30K (manufactured by Kosaka Laboratory Ltd.). On the basis of the measurement obtained, a center plane average surface roughness (sRa) was determined.

EXAMPLE 1

A propylene copolymer (A) was obtained by producing, in a first step, a propylene homopolymer portion having an intrinsic viscosity of 2.8 dL/g by using a Ziegler-Natta type catalyst, and subsequently producing, in a second step, a propylene-ethylene copolymer portion having an intrinsic viscosity of 2.8 dL/g and an ethylene content of 36% by weight. The content of the propylene-ethylene copolymer portion was 21% by weight.

To 95 parts by weight of the obtained propylene copolymer (A) were added 5 parts by weight of SUMIKATHENE L405 (produced by Sumitomo Chemical Co., Ltd., density=0.924 $g/cm^3$, MFR=3.7 g/10 minutes) as an ethylene polymer, 0.05 parts by weight of calcium stearate, 0.05 parts by weight of vitamin E, and 0.019 parts by weight of 2,5-dimethyl-2,5-di(tert-butylperoxy)hexane as an organic peroxide, followed by the execution of melt-kneading at 270° C. with a 40-mm single screw extruder (VS40-28, manufactured by Tanabe Plastics Machinery Co., Ltd., equipped with a full-flighted screw). Thus, a polypropylene resin composition having an MFR of 1.9 (g/10 minutes) was obtained.

The obtained polypropylene resin composition was subjected to melt-extrusion at a resin temperature of 280° C. with a 50-mm T-die film extruder (Film extruder V-50-F600, manufactured by Tanabe Plastics Machinery Co., Ltd., equipped with a 400-mm wide T-die). The melt-extrudate was cooled over a chill roll in which 50° C. cooling water was circulated to obtain a film 30 μm in thickness. Properties of the obtained film are shown in Table 1.

EXAMPLE 2

A polypropylene resin composition having an MFR of 4.2 (g/10 minutes) was obtained by the same method as that used in Example 1 except for changing the amount of 2,5-dimethyl-2,5-di(tert-butylperoxy)hexane to 0.05 parts by weight.

The obtained polypropylene resin composition was subjected to extrusion processing in the same manner as Example 1 to obtain a film. Properties of the obtained film are shown in Table 1.

EXAMPLE 3

A polypropylene resin composition having an MFR of 8.0 (g/10 minutes) was obtained by the same method as that used in Example 1 except for changing the amount of 2,5-dimethyl-2,5-di(tert-butylperoxy)hexane to 0.09 parts by weight.

The obtained polypropylene resin composition was subjected to extrusion processing in the same manner as Example 1 to obtain a film. Properties of the obtained film are shown in Table 1.

EXAMPLE 4

A polypropylene resin composition having an MFR of 2.4 (g/10 minutes) was obtained by the same method as that used in Example 1 except for using G1801 (produced by Keiyo Ethylene Co., Ltd., density=0.961 $g/cm^3$, MFR=7 g/10 minutes) as an ethylene polymer and changing the amount of 2,5-dimethyl-2,5-di(tert-butylperoxy)hexane to 0.025 parts by weight.

The obtained polypropylene resin composition was subjected to extrusion processing in the same manner as Example 1 to obtain a film. Properties of the obtained film are shown in Table 1.

COMPARATIVE EXAMPLE 1

A polypropylene resin composition having an MFR of 2.1 (g/10 minutes) was obtained by the same method as that used in Example 1 except for changing the amount of the propylene copolymer (A) to 100 parts by weight and using no ethylene polymer.

The obtained polypropylene resin composition was subjected to extrusion processing in the same manner as Example 1 to obtain a film. Properties of the obtained film are shown in Table 1.

COMPARATIVE EXAMPLE 2

A polypropylene resin composition having an MFR of 2.5 (g/10 minutes) was obtained by the same method as that used in Example 1 except for using SUMIKATHENE G801 (produced by Sumitomo Chemical Co., Ltd., density=0.919 $g/cm^3$, MFR=20 g/10 minutes) as an ethylene polymer and changing the amount of 2,5-dimethyl-2,5-di(tert-butylperoxy) hexane to 0.025 parts by weight.

The obtained polypropylene resin composition was subjected to extrusion processing in the same manner as Example 1 to obtain a film. Properties of the obtained film are shown in Table 1.

COMPARATIVE EXAMPLE 3

A polypropylene resin composition having an MFR of 2.3 (g/10 minutes) was obtained by the same method as that used in Example 1 except for changing the amount of the propylene copolymer (A) to 92 parts by weight, the amount of the ethylene polymer to 8 parts by weight, and the amount of 2,5-dimethyl-2,5-di(tert-butylperoxy)hexane to 0.025 parts by weight.

The obtained polypropylene resin composition was subjected to extrusion processing in the same manner as Example 1 to obtain a film. Properties of the obtained film are shown in Table 1.

COMPARATIVE EXAMPLE 4

A polypropylene resin composition having an MFR of 2.0 (g/10 minutes) was obtained by the same method as that used in Example 1 except for using SUMIKATHENE E, FV401 (produced by Sumitomo Chemical Co., Ltd., density=0.902 $g/cm^3$, MFR=4 g/10 minutes) as an ethylene polymer and changing the amount of 2,5-dimethyl-2,5-di(tert-butylperoxy)hexane to 0.025 parts by weight.

The obtained polypropylene resin composition was subjected to extrusion processing in the same manner as Example 1 to obtain a film. Properties of the obtained film are shown in Table 1.

COMPARATIVE EXAMPLE 5

A propylene copolymer (A) was obtained by producing, in a first step, a propylene homopolymer portion having an intrinsic viscosity of 1.8 dL/g by using a Ziegler-Natta type catalyst, and subsequently producing, in a second step, a propylene-ethylene copolymer portion having an intrinsic viscosity of 3.5 dL/g and an ethylene content of 30% by weight. The content of the propylene-ethylene copolymer portion was 22% by weight.

To 95 parts by weight of the obtained propylene copolymer (A') were added 5 parts by weight of SUMIKATHENE L405 (produced by Sumitomo Chemical Co., Ltd., density=0.924 g/cm$^3$, MFR=3.7 g/10 minutes) as an ethylene polymer, 0.05 parts by weight of calcium stearate, and 0.05 parts by weight of vitamin E, followed by the execution of melt-kneading at 270° C. with a 40-mm single screw extruder (VS40-28, manufactured by Tanabe Plastics Machinery Co., Ltd., equipped with a full-flight screw). Thus, a polypropylene resin composition having an MFR of 2.2 (g/10 minutes) was obtained.

The obtained polypropylene resin composition was subjected to extrusion processing in the same manner as Example 1 to obtain a film. Properties of the obtained film are shown in Table 1.

COMPARATIVE EXAMPLE 6

A film was obtained by mixing 95 parts by weight of pellets of the polypropylene resin composition obtained in Comparative Example 1 and 5 parts by weight of pellets of SUMIKATHENE L405 (produced by Sumitomo Chemical Co., Ltd., density=0.924 g/cm$^3$, MFR=3.7 g/10 minutes) as an ethylene polymer, and then executing extrusion processing in the same manner as Example 1. Properties of the obtained film are shown in Table 1.

COMPARATIVE EXAMPLE 7

A polypropylene resin composition having an MFR of 3.9 (g/10 minutes) was obtained by the same method as that used in Comparative Example 1 except for changing the amount of 2,5-dimethyl-2,5-di(tert-butylperoxy)hexane to 0.04 parts by weight.

The obtained polypropylene resin composition was subjected to extrusion processing in the same manner as Example 1 to obtain a film. Properties of the obtained film are shown in Table 1.

COMPARATIVE EXAMPLE 8

A polypropylene resin composition having an MFR of 2.3 (g/10 minutes) was obtained by the same method as that used in Example 1 except for changing the amount of the propylene copolymer (A) to 99 parts by weight and the amount of the ethylene polymer to 1 part by weight.

The obtained polypropylene resin composition was subjected to extrusion processing in the same manner as Example 1 to obtain a film. Properties of the obtained film are shown in Table 1.

COMPARATIVE EXAMPLE 9

A polypropylene resin composition having an MFR of 1.2 (g/10 minutes) was obtained by the same method as that used in Example 1 except for changing the amount of 2,5-dimethyl-2,5-di(tert-butylperoxy)hexane to 0.01 parts by weight.

The obtained polypropylene resin composition was subjected to extrusion processing in the same manner as Example 1 to obtain a film. Properties of the obtained film are shown in Table 1.

| | Propylene-based polymer | | Ethylene polymer | | | | Organic peroxide | MFR of polypropylene resin |
|---|---|---|---|---|---|---|---|---|
| | Kind | part by weight | Name | Density g/cm$^3$ | MFR g/10 minutes | part by weight | part by weight | composition g/10 min. |
| Example 1 | A | 95 | L405 | 0.924 | 3.7 | 5 | 0.019 | 1.9 |
| Example 2 | A | 95 | L405 | 0.924 | 3.7 | 5 | 0.05 | 4.2 |
| Example 3 | A | 95 | L405 | 0.924 | 3.7 | 5 | 0.09 | 8.0 |
| Example 4 | A | 95 | G1801 | .0961 | 7 | 5 | 0.025 | 2.4 |
| Comparative Example 1 | A | 100 | — | — | — | 0 | 0.019 | 2.1 |
| Comparative Example 2 | A | 95 | G801 | 0.919 | 20 | 5 | 0.025 | 2.5 |
| Comparative Example 3 | A | 92 | L405 | 0.924 | 3.7 | 8 | 0.025 | 2.3 |
| Comparative Example 4 | A | 95 | FV401 | 0.902 | 4 | 5 | 0.025 | 2.0 |
| Comparative Example 5 | A' | 95 | L405 | 0.924 | 3.7 | 5 | 0 | 2.2 |
| Comparative Example 6 | A | — | — | — | — | — | 0.019 | — |
| | — | — | L405 | 0.924 | 3.7 | — | — | — |
| Comparative Example 7 | A | 100 | — | — | — | 0 | 0.04 | 3.9 |
| Comparative Example 8 | A | 99 | L405 | 0.924 | 3.7 | 1 | 0.019 | 2.3 |
| Comparative Example 9 | A | 95 | L405 | 0.924 | 3.7 | 5 | 0.01 | 1.2 |

| | Pellet mixing | Haze % | Antiblocking property 60° C. kg/12 cm² | Impact resistance −15° C. kg·cm/mm | Appearance Fisheye fisheyes/ 100 cm² | Surface roughness sRa μm |
|---|---|---|---|---|---|---|
| Example 1 | — | 36 | 0.94 | 14 | 4 | 0.142 |
| Example 2 | — | 40 | 0.99 | 17 | 7 | 0.154 |
| Example 3 | — | 43 | 0.81 | 18 | 14 | 0.159 |
| Example 4 | — | 31 | 0.79 | 16 | 7 | 0.116 |
| Comparative Example 1 | — | 29 | 1.12 | 26 | 0 | 0.100 |
| Comparative Example 2 | — | 30 | 1.20 | 14 | 3 | 0.125 |
| Comparative Example 3 | — | 38 | 0.88 | 9 | 5 | 0.143 |
| Comparative Example 4 | — | 23 | 1.09 | 25 | 6 | 0.094 |
| Comparative Example 5 | — | 61 | 0.50 | 29 | 21 | 0.199 |
| Comparative Example 6 | 95 wt % 5 wt % | 33 | 1.13 | 18 | 5 | 0.128 |
| Comparative Example 7 | — | 26 | 1.26 | 30 | 3 | 0.097 |
| Comparative Example 8 | — | 29 | 1.17 | 25 | 4 | 0.109 |
| Comparative Example 9 | — | 31 | 0.95 | 9 | 4 | 0.128 |

It is shown that the Examples which satisfy the requirements of the present invention are excellent in transparency, antiblocking property, impact resistance and appearance evaluation (fisheye).

On the other hand, it is shown that Comparative Examples 1, 7, and 8, in which the amount of the ethylene polymer (B) is less than 2 parts by weight, are poor in antiblocking property.

Comparative Example 3, in which the amount of the ethylene polymer (B) is more than 6 parts by weight, is shown to be poor in impact resistance.

It is shown that Comparative Examples 2 and 4, in which the density of the ethylene polymer fails to satisfy a requirement of the present invention, are poor in antiblocking property.

It is shown that Comparative Example 5, in which the intrinsic viscosity of the (A-1 portion) of the propylene copolymer (A) fails to satisfy a requirement of the present invention, and melt-kneadind was carried out in the absence of an organic peroxide, is poor in transparency and appearance.

Comparative Example 9, in which the melt flow rate of the polypropylene resin composition fails to satisfy a requirement of the present invention, is shown to be poor in impact resistance.

Comparative Example 6, in which the ethylene polymer (B) was not melt-kneaded in the presence of an organic peroxide, is shown to be poor in antiblocking property.

INDUSTRIAL APPLICABILITY

According to the present invention, there can be obtained a polypropylene resin composition suitable as a material of film for packaging retortable foods, the film being excellent in appearance, transparency, impact resistance and antiblocking property, and a film made thereof.

The invention claimed is:

1. A polypropylene resin composition that has a melt flow rate at 230° C. of 1.5 g/10 minutes or more and is obtainable by melt-kneading 94 to 98 parts by weight of (A) a propylene copolymer that comprises a polymer portion being obtainable by polymerizing monomers containing propylene as the major component and having an intrinsic viscosity of 2.0 dL/g or more and a copolymer portion being obtainable by copolymerizing propylene and ethylene, 2 to 6 parts by weight of (B) an ethylene polymer having a density of 0.920 g/cm³ or more and having a melt flow rate at 190° C. of 3.0 g/10 minutes or more, and (C) an organic peroxide, provided that the total weight of the propylene copolymer (A) and the ethylene polymer (B) is let to be 100 parts by weight.

2. The polypropylene resin composition of claim 1, wherein the content of the organic peroxide (C) is 0.012 to 0.1 parts by weight relative to 100 parts by weight of the propylene copolymer (A) and the ethylene polymer (B) in total.

3. A film obtainable by forming the polypropylene resin composition of claim 1 into a film.

4. The film of claim 3, wherein the surface roughness Ra of the film is 0.14 μm or more.

5. A film obtainable by forming the polypropylene resin composition of claim 2 into a film.

* * * * *